United States Patent
Bergus et al.

(10) Patent No.: US 7,311,198 B2
(45) Date of Patent: Dec. 25, 2007

(54) STORAGE DEVICE FOR COMPACT DISCS

(76) Inventors: Peter Bergus, P.O. Box 6, White Marsh, MD (US) 21162; Vivian Bergus, P.O. Box 6, White Marsh, MD (US) 21162

( * ) Notice: Subject to any disclaimer, the term of this patent is extended or adjusted under 35 U.S.C. 154(b) by 299 days.

(21) Appl. No.: 10/941,368

(22) Filed: Sep. 15, 2004

(65) Prior Publication Data

US 2005/0016878 A1    Jan. 27, 2005

(51) Int. Cl.
*B65D 85/30* (2006.01)

(52) U.S. Cl. .................................. 206/308.1; 206/312

(58) Field of Classification Search ............ 206/308.1, 206/309–313, 493, 303, 304.2, 459.5, 499, 206/509, 511, 512
See application file for complete search history.

(56) References Cited

U.S. PATENT DOCUMENTS

| | | | |
|---|---|---|---|
| D357,388 S | 4/1995 | Gafin ........................... D7/625 |
| 5,495,953 A | 3/1996 | Bearth .......................... 211/40 |
| 5,775,659 A | 7/1998 | Hartlaub et al. ............. 248/346 |
| 6,077,583 A * | 6/2000 | Park ............................ 428/64.1 |
| 6,112,917 A | 9/2000 | Baker et al. .................. 211/40 |
| 6,179,121 B1 | 1/2001 | Ferguson et al. ........... 206/311 |
| 6,188,032 B1 | 2/2001 | Hartman ...................... 200/308 |
| D460,899 S | 7/2002 | Tu ............................... D7/624 |
| 6,619,608 B1 | 9/2003 | Mulvey et al. ............. 248/346 |
| 6,705,472 B2 | 3/2004 | Cross et al. .................. 211/40 |
| 6,771,588 B2 * | 8/2004 | Poole et al. ................. 720/719 |
| 6,817,025 B2 * | 11/2004 | Boorman .................... 720/719 |
| 6,860,388 B2 * | 3/2005 | Boorman ................. 206/308.1 |
| 6,883,663 B2 * | 4/2005 | Laut ........................ 206/308.1 |
| 6,901,600 B2 * | 5/2005 | Liu ............................. 720/719 |
| 6,964,401 B1 * | 11/2005 | Kelley et al. .......... 248/346.11 |
| 2003/0131513 A1 * | 7/2003 | Runge .......................... 40/718 |

\* cited by examiner

*Primary Examiner*—Shian T. Luong
(74) *Attorney, Agent, or Firm*—H. Jay Spiegel

(57) ABSTRACT

A device for storing a compact disc includes: (a) a body member (2) having a top (4) and bottom (6) surfaces, a portion proximate its perimeter that turns upward so as to allow the member's outer edge (12) to turn back inward towards the center of the member so as to form a lip (14) whose edge (12) defines an opening (16) that lies above the top (4) surface, and (b) indicia (20) projecting downward from the bottom (6) surface, wherein: (i) the lip (14) is formed from a pliable material, (ii) the opening defines a space through which a compact disc can pass with specified friction due to rubbing between the edges of the opening (12) and the compact disc which is to be laid against the member's top surface (4), (iii) the indicia (20) is located on the bottom (6) surface so as to be within a space defined by the opening of a second, similar device whose top surface is placed below the bottom (6) surface so that the devices may be stacked one upon the other, and (iv) the upward turned portion proximate the member's perimeter has a height that is greater than the thickness of the compact disc.

3 Claims, 5 Drawing Sheets

FIG. 9
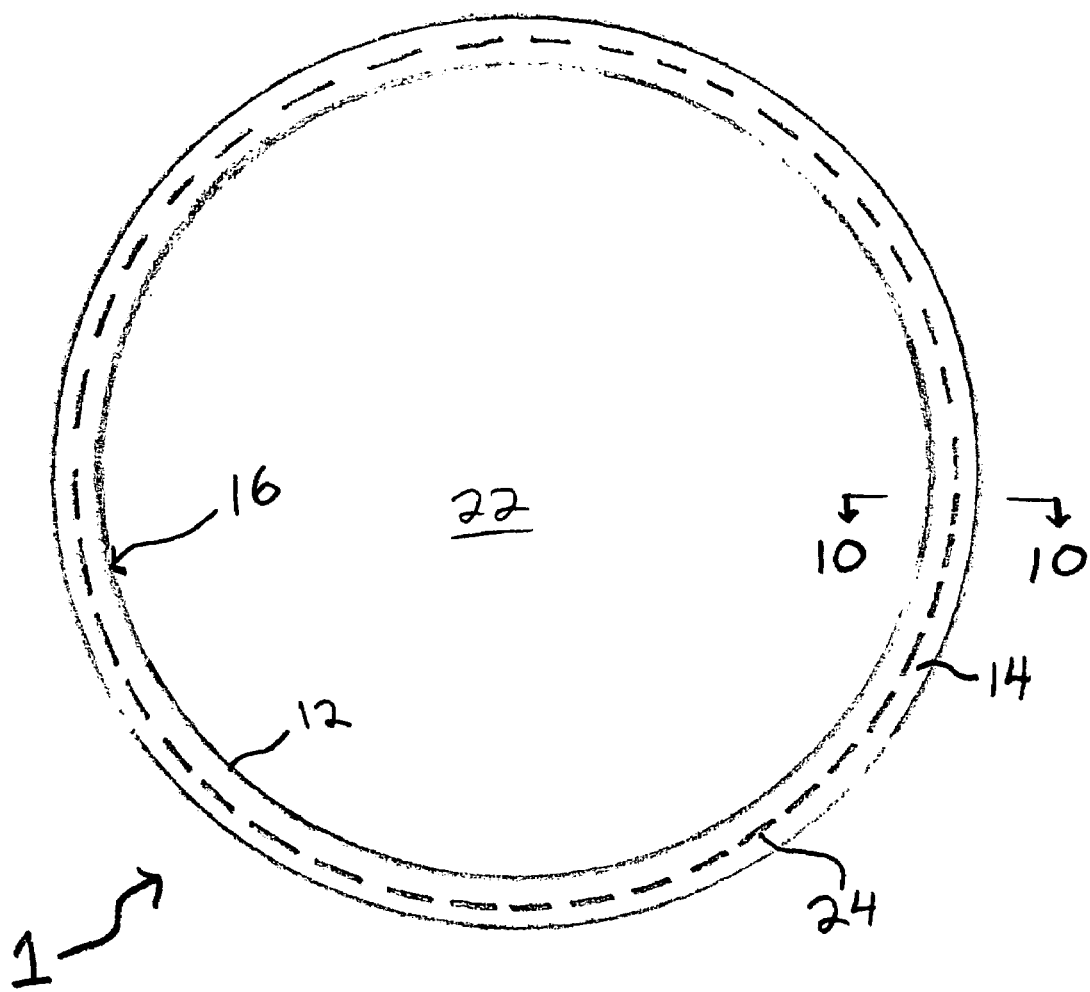
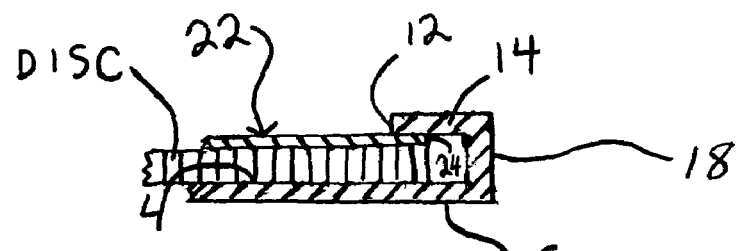
FIG. 10

STORAGE DEVICE FOR COMPACT DISCS

BACKGROUND OF THE INVENTION

1. Field of the Invention

This invention relates to a specialty receptacle or package. More particularly, the present invention relates to a device for storing, protecting or displaying compact discs.

2. Description of Prior Art

Currently the compact disc or CD is the medium of choice for a wide range of electronic media, e.g., recorded music and video as well as computer software. A compact disc has digital data on the underside of the CD which are read by a laser mechanism.

CD's are typically purchased in flattened, hinged cases, commonly referred to as "jewel cases", although other protective means are sometimes employed. The CD is retained in place within a jewel case by a resilient "post" onto which the CD is snapped. It is advisable to avoid touching the underside of the CD, because the data impressed thereon can be made unreadable by skin oils and the like. Jewel cases are usually formed of clear transparent plastic which allows a label to be viewed through the walls of the jewel cases.

There are a number of types of structures or racks for holding a plurality of CD's at a location convenient to a CD player or deck. Some types have slots sized to allow a CD within a jewel case to be placed therein.

Although jewel cases function well in protecting CD's stored therein, they may not be the best or ideal way for storing or transporting CD's. The present invention presents an alternative way for protecting, storing or displaying CD's.

OBJECTS AND ADVANTAGES

There has been summarized above, rather broadly, the background that is related to the present invention in order that the context of the present invention may be better understood and appreciated. In this regard, it is instructive to also consider the objects and advantages of the present invention.

It is an object of the present invention to provide a storage device for computer, audio and video compact discs.

It is another object of the present invention to provide promotional device for use with computer, audio and video compact discs.

It is also an object of the present invention to provide a storage device for computer, audio and video compact discs which also has value as a promotional tool because of the ability to place promotional indicia on the especially crafted lower surface of the device.

It is an additional object of the present invention to provide a protective device for computer, audio and video compact discs.

It is an object of the present invention to provide a means for extending the service life of computer, audio and video compact discs.

It is another object of the present invention to provide a means for storing and stacking both individual and groups of computer, audio and video compact discs.

These and other objects and advantages of the present invention will become readily apparent as the invention is better understood by reference to the accompanying summary, drawings and the detailed description that follows.

SUMMARY OF THE INVENTION

In a first preferred embodiment, a device for storing a compact disc includes: (a) a body member having top and bottom surfaces, a portion proximate its perimeter that turns upward so as to allow the member's outer edge to turn back inward towards the center of the member so as to form a lip whose edge defines an opening that lies above the top surface, and (b) indicia projecting downward from the bottom surface, wherein: (i) the lip is formed from a pliable material, (ii) the opening defines a space through which a compact disc can pass with specified friction due to rubbing between the edges of the opening and the compact disc which is to be laid against the member's top surface, (iii) the indicia is located on the bottom surface so as to be within a space defined by the opening of a second, similar device whose top surface is placed below the bottom surface of the first device so that the devices may be stacked one upon the other, and (iv) the upward turned portion proximate the member's perimeter has a height that is greater than the thickness of the compact disc.

Thus, there has been summarized above, rather broadly, the present invention in order that the detailed description that follows may be better understood and appreciated. There are, of course, additional features of the invention that will be described hereinafter and which will form the subject matter of any eventual claims to this invention.

BRIEF DESCRIPTION OF THE DRAWINGS

FIG. 9 is a top view similar to that of FIG. 1 showing the thin, flat protective jacket of the present invention.

FIG. 10 shows a cross-sectional view along the line 10-10 of FIG. 9.

DETAILED DESCRIPTION OF THE PREFERRED EMBODIMENT

Figure 1:
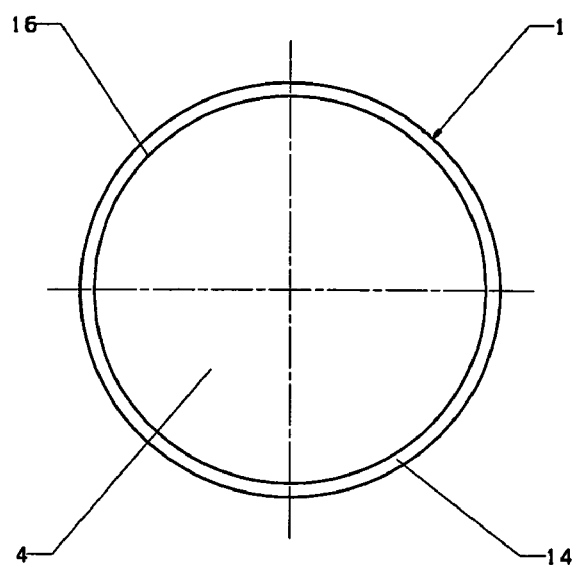
FIG. 1 is a top view of a preferred embodiment of the present invention showing the general shape of its elements.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 2:
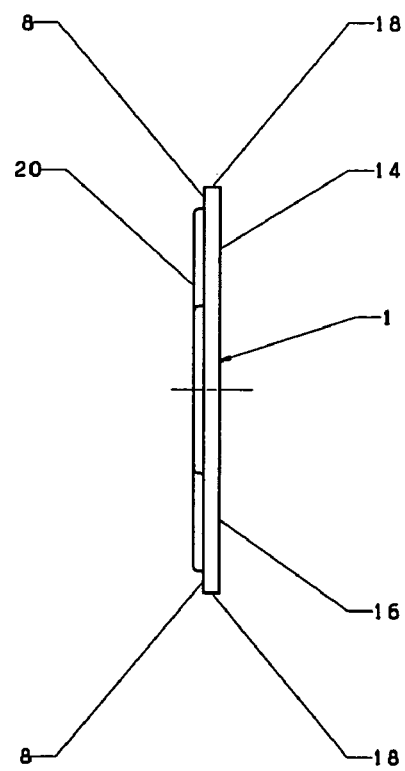
FIG. 2 is a side view of the embodiment shown in FIG. 1.
Figure 3:
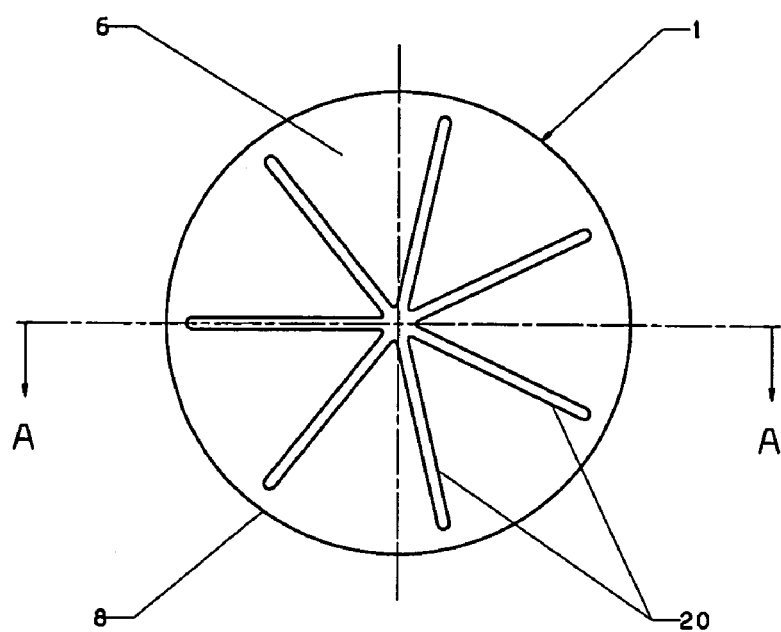
FIG. 3 is a bottom view of the embodiment shown in FIG. 1.

FIGS. 1, 2 and 3 show top, side and bottom views, respectively of a preferred embodiment of the present invention. It is a storage and stacking device 1 for either computer, audio or video compact discs. It consists of a generally flat body member 2 having top 4 and bottom 6 surfaces. Its perimeter 8 has an upward turned portion 10 whose outer edge 12 actually turns back inward so as to form a lip 14 that overhangs and is relatively parallel to the plane defined by the top 4 surface of the body member 2. This lip can also be viewed as defining a circular opening 16 for a plane through which anything must pass in order to make contact with the member's top 4 surface. The member's upward turned perimeter portion 10 also serves to form an effective outer, protective wall 18 for any thin, flat object that might be fully lying on the member's top 4 surface.

Figure 4:
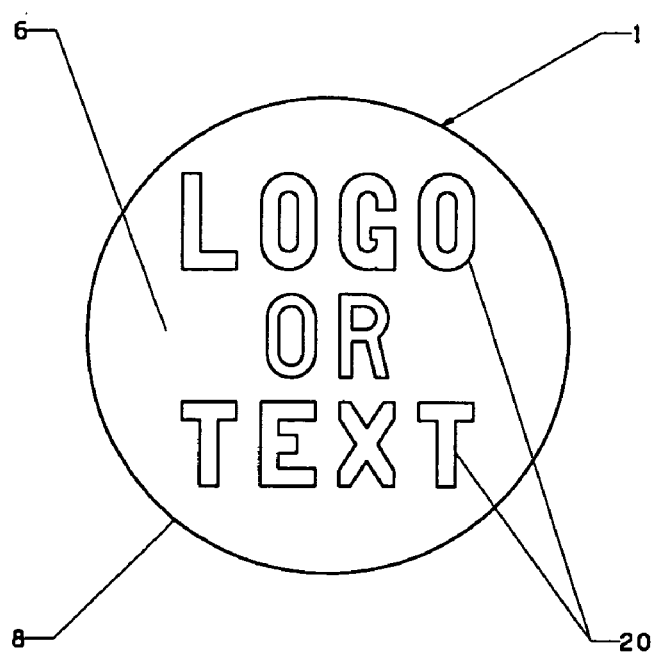
FIG. 4 is a bottom view of another embodiment in which the bottom surface has a raised logo or text added to it rather than a generalized geometric pattern as shown in FIG. 3.

Attached to or molded into and projecting downward from the member's bottom 6 surface is raised indicia 20. This indicia 20 may take the form of any convenient geometric shape, such as the outwardly directed lines shown in FIG. 3 or individual raised surfaces that are judiciously placed at various points on the member's bottom surface 6. A basic purpose of these indicia 20 is to aid in preventing the member's bottom surface 6 from attaching to any wet or otherwise tacky surface on which the member may be laid. Alternatively, the indicia 20 of this bottom surface may take the form of a logo, as shown in FIG. 4, that is used for some type of promotional, novelty or informational purpose (e.g., advertisement, advocacy, sponsorship, endorsement, amusement, material safety data).

Figure 5:
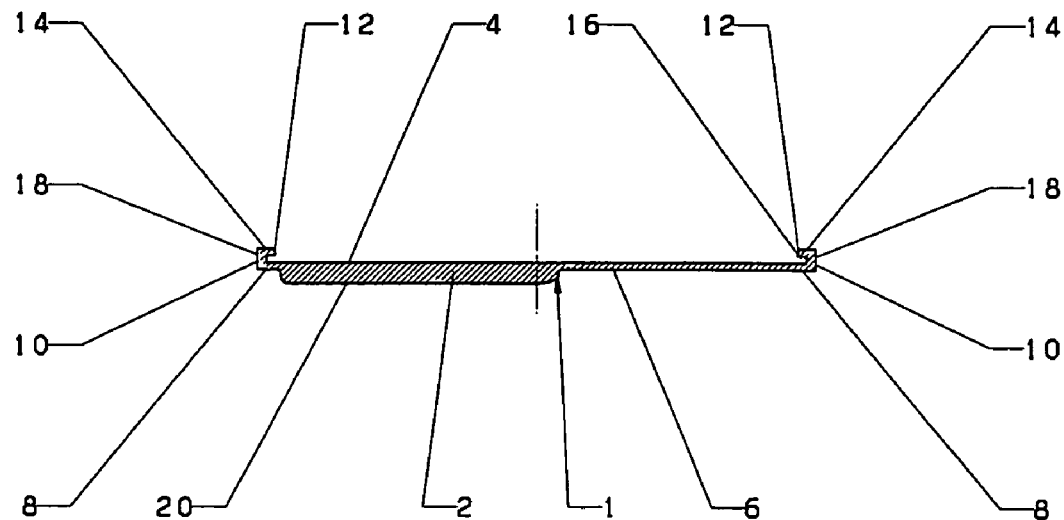
FIG. 5 is a cross-sectional view taken along the line A-A shown in FIG. 1.
Figure 6:
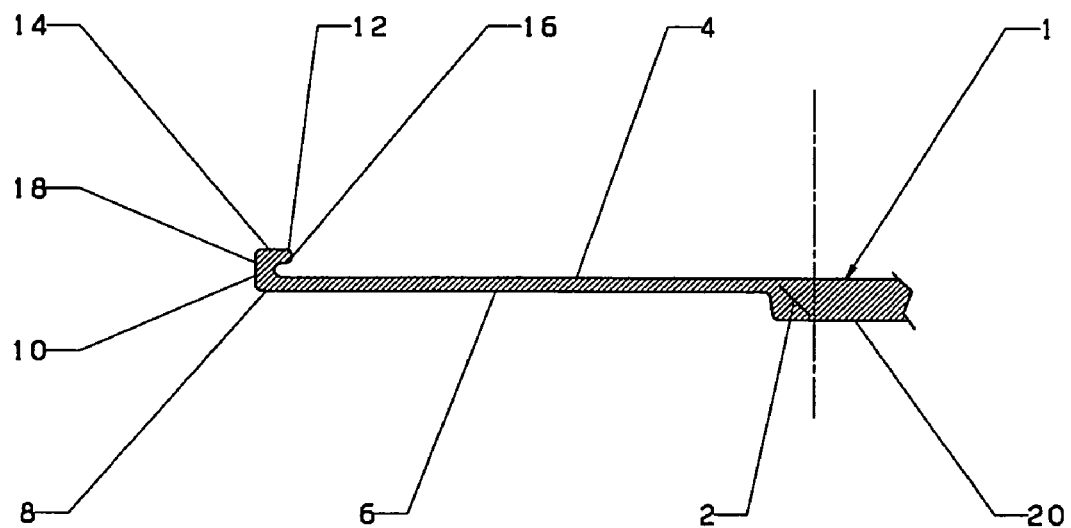
FIG. 6 is an enlarged view of the left hand portion of the embodiment shown in FIG. 5.

As shown in FIGS. 5 and 6, the perimeter of this embodiment of the member 2 takes the form of a circle. However, any other geometrical shape (i.e., rectangle, square, polygon) could be used.

Since this device will be used to store and/or display compact discs, its opening 16 is circular and has a diameter that is slightly less than that of a compact disc. Of course, it should be recognized this opening 16 need not be exactly circular. For example, it could have some type of scalloped edge. What is required of this opening's edge 12 is that it essentially define a space through which a compact disc can pass with some friction due to rubbing between the opening and disc edges and assuming that the lip 14 is pliable.

Figure 8:
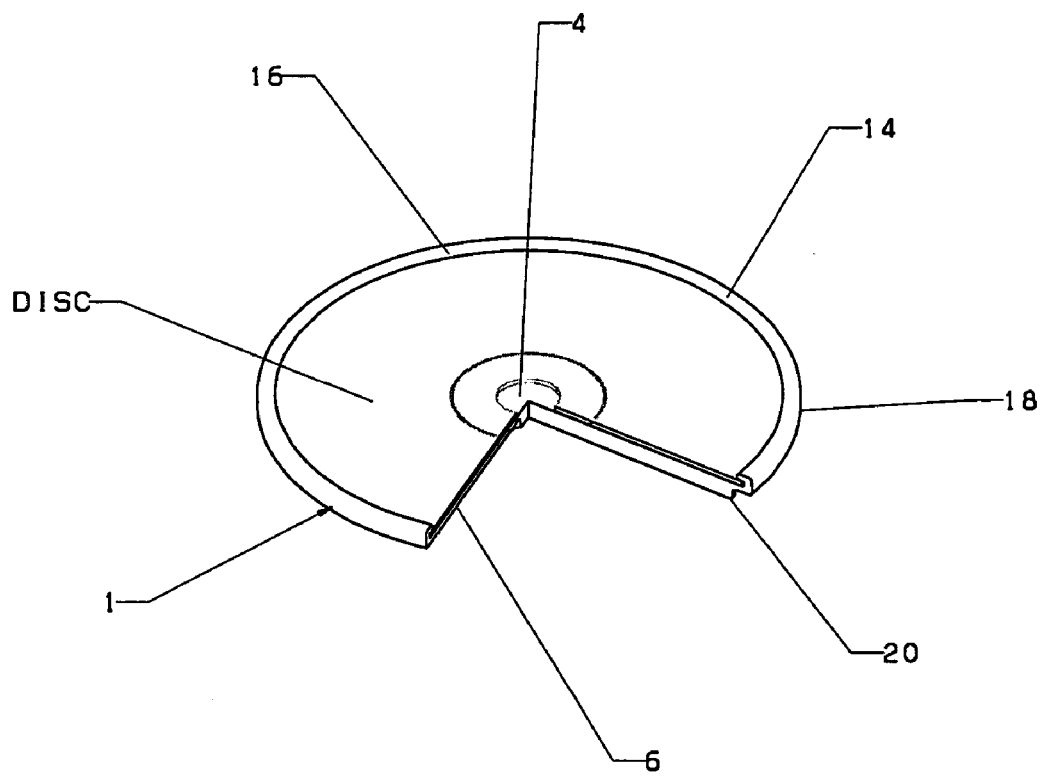
FIG. 8 is a perspective view of the embodiment shown in FIG. 1 with a compact disk lying in the device and with a cutaway portion that shows the relation of the disk's edge to the device's lip.

The member itself, or at least it's lip 14, is made of elastic material which allows the lip 14 to be bent outward so as to allow a compact disc to pass through the opening 16 and lie on the member's top 4 surface. In this position, the lip 14 is seen to actually overhang and enclose the edges of the compact disc so as to prevent it from falling away from the member's top 4 surface. This is aided by sizing the member's effective outer wall 18 so that it is just greater than the height or thickness of a compact disc so that the lip 14 lies just above a disk lying on the member's top 4 surface. See FIG. 8 which has a cutaway portion that shows the relation of the edge of a compact disc held in the device.

Figure 7:
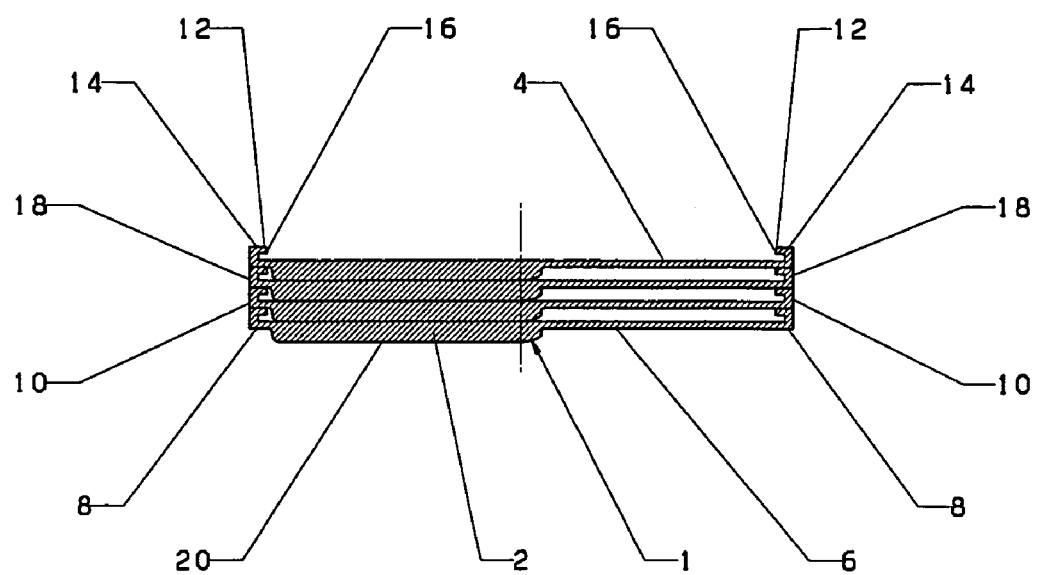
FIG. 7 shows a cross-sectional view similar to that shown in FIG. 5 but in the situation where a number of the embodiments shown in FIG. 5 have been stacked on top of each other.

FIG. 7 shows that there is a relationship between the height of the effective outer wall 18 and the height of the raised indicia 20 that is attached to the member's bottom 6 surface. These heights are established as being approximately equal so as to aid in allowing the devices to be stacked one upon the other in such a manner that the raised indicia fits within the lip's opening 16 and can rest on the member's top 2 surface. This obviously puts a constraint on the places on the member's bottom 6 surface where the raised indicia 20 can be located (i.e., the indicia 20 has to fit through the lip's opening 16). Thus, the indicia 20 are located so as to be within a space defined by the opening of a second, similar device whose top surface is placed below the first device's bottom 6 surface.

More protection for a compact disc can be provided by sizing the height of the effective outer wall 18 so that the gap between the underside of the lip 14 and the member's top surface is sufficiently wide so as to accommodate a thin, flat protective jacket 22 (FIGS. 9 and 10) which is sized similar to a compact disc and lies on the disc's top surface when it is placed in the device. The jacket 22 has an outer periphery 24 captured under the lip 14 (FIG. 10).

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention.

We claim:

1. A device for storing a compact disc comprising:
a body member (2) having a top surface (4) and a bottom (6) surface, and a portion proximate a perimeter of said body member that turns upward so as to allow an outer edge (18) of said body member to turn back inward toward a center of said body member so as to form a lip (14) whose inner edge (12) defines an opening (16) that lies above said top (4) surface, said lip having an upper surface,
indicia (20) projecting downward from said bottom (6) surface,
wherein said lip (14) is formed from a pliable material, and
wherein said opening configured so as to allow a compact disc to pass through said opening, with specified friction due to rubbing between the edges of the opening (12) and said compact disc, so that said compact disc may lay against said member top surface (4), said indicia (20) being located on said bottom (6) surface spaced radially inwardly from said outer edge of said body member so as to be within a space defined by an opening of a second, similar device whose top surface is placed below said bottom (6) surface so that said devices may be stacked one upon the other with said indicia entering said opening of said second, similar device, and a thin flat jacket (22) that is configured to sit on and cover a top said surface of a compact disc and fit through said opening (16) when a said compact disc has been placed in said device.

2. A device as recited in claim 1, wherein said upward turned portion proximate the perimeter of said member (2) has a height that is greater than a thickness of a compact disc adapted to be placed into said device.

3. A device as recited in claim 1, wherein said indicia are configured to communicate a message that is used for a purpose selected from the group consisting of promotional, novelty or informational purposes.

* * * * *